(12) United States Patent
Sharma

(10) Patent No.: US 11,118,924 B2
(45) Date of Patent: Sep. 14, 2021

(54) METHOD AND SYSTEM FOR PREDICTING TRAFFIC CONDITIONS

(71) Applicant: ANI TECHNOLOGIES PRIVATE LIMITED, Bengaluru (IN)

(72) Inventor: Anand Sharma, Madhya Pradesh (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 0 days.

(21) Appl. No.: 16/990,334

(22) Filed: Aug. 11, 2020

(65) Prior Publication Data

US 2020/0370912 A1    Nov. 26, 2020

Related U.S. Application Data

(63) Continuation of application No. 15/916,739, filed on Mar. 9, 2018, now Pat. No. 10,775,186.

(30) Foreign Application Priority Data

Dec. 29, 2017   (IN) .............................. 201741047157

(51) Int. Cl.
*G06F 16/29*   (2019.01)
*G01C 21/34*   (2006.01)
*G08G 1/01*    (2006.01)
*H04W 4/02*    (2018.01)
(Continued)

(52) U.S. Cl.
CPC ......... *G01C 21/3492* (2013.01); *G06F 16/29* (2019.01); *G06F 16/9024* (2019.01); *G08G 1/012* (2013.01); *G08G 1/0129* (2013.01); *G08G 1/0141* (2013.01); *G08G 1/09685* (2013.01); *G08G 1/096816* (2013.01);
(Continued)

(58) Field of Classification Search
CPC ............... G08G 1/0125; G08G 1/0129; G08G 1/096844; G01C 21/36; G01C 21/3617
See application file for complete search history.

(56) References Cited

U.S. PATENT DOCUMENTS 6,317,686 B1    11/2001 Ran
7,433,889 B1    10/2008 Barton
2007/0013551 A1  1/2007 Gueziec
(Continued)

OTHER PUBLICATIONS

Non-Final Office Action issued in U.S. Appl. No. 15/916,739 dated Jan. 16, 2020.
(Continued)

*Primary Examiner* — Kenneth J Malkowski
(74) *Attorney, Agent, or Firm* — Chip Law Group

(57) ABSTRACT

A method and a system for predicting traffic conditions of a geographical area are provided. Position information, received from devices of corresponding vehicles that are traversing between road segments of a road network including at least first and second road segments, is located on a directed graph of the road network. Further, first and second times are determined based on the located position information on the directed graph. A traffic time of the first road segment is determined based on an average of time differences of the first and second times of each of the one or more first vehicles after filtering out a time period between the first and second times. The traffic conditions of the road network are predicted based on the determined traffic time of each of the road segments.

20 Claims, 9 Drawing Sheets

(51) Int. Cl.
G08G 1/0968 (2006.01)
G06F 16/901 (2019.01)
(52) U.S. Cl.
CPC . *G08G 1/096838* (2013.01); *G08G 1/096883* (2013.01); *H04W 4/025* (2013.01)

(56) References Cited

U.S. PATENT DOCUMENTS

| | | | |
|---|---|---|---|
| 2008/0033636 A1* | 2/2008 | Ryu | G01C 21/3492 |
| | | | 701/533 |
| 2012/0173136 A1 | 7/2012 | Ghoting et al. | |
| 2012/0221232 A1* | 8/2012 | Shang | H04W 4/026 |
| | | | 701/119 |
| 2013/0179205 A1* | 7/2013 | Slinin | G06Q 10/06 |
| | | | 705/7.13 |
| 2016/0292999 A1 | 10/2016 | Xie | |
| 2018/0096597 A1* | 4/2018 | Mortazavi | H04W 4/023 |

OTHER PUBLICATIONS

Notice of Allowance issued in U.S. Appl. No. 15/916,739 dated May 13, 2020.

* cited by examiner

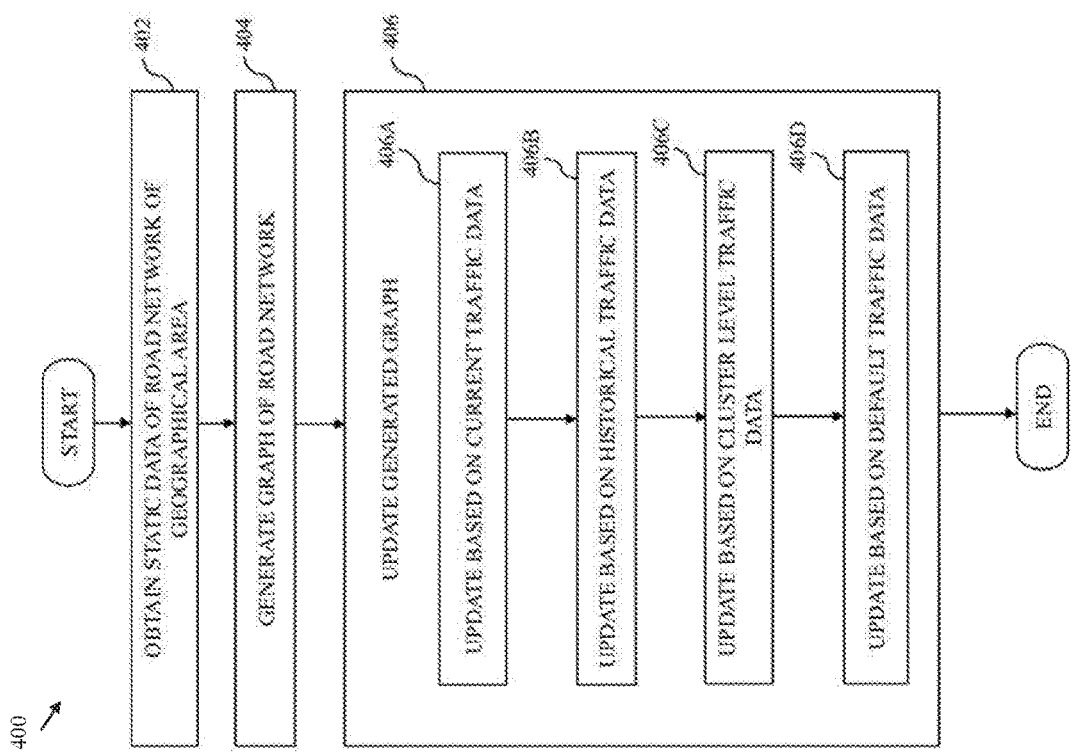

METHOD AND SYSTEM FOR PREDICTING TRAFFIC CONDITIONS

CROSS-RELATED APPLICATIONS

This application is a continuation application from U.S. application Ser. No. 15/916,739, filed Mar. 9, 2018, which claims priority of Indian Application Serial No. 201741047157, filed Dec. 29, 2017, the contents of which are incorporated herein by reference.

FIELD

The present invention relates generally to the field of cartography and navigation systems, and more particularly, to a method and a system for predicting traffic conditions of a geographical area.

BACKGROUND

With improvements in lifestyle of individuals, demand for private and public means of transportations, such as cars, bikes, buses, and the like, has been continuously increasing. In every society, there are individuals, for example, the individuals who can afford the private means of transportations and the individuals who cannot afford the private means of transportation. The former individuals prefer their private means of transportation for traversing between source and destination locations. However, the latter individuals rely on the public means of transportations for traversing between the source and destination locations.

s the demand for the private and public means of transportation is continuously increasing, number of vehicles traversing along roads of a geographical area to meet the increasing demand has also increased. Each road has a limited capacity and due to the increase in the number of vehicles, traffic along each road has continued to increase at a rate that is greater than increase in the road capacity. Due to the continuous increase in the traffic along the roads, the individuals are often delayed in reaching their destinations, which may cause adverse effects on their well-being, business operations, government operations, or the like. Accordingly, appropriate actions have been taken to reduce the increasing traffic, for example, by obtaining and providing current traffic conditions to the individuals, which helps the individuals manage their travel better, thereby reducing the traffic on the roads. The current traffic conditions may be obtained by means of traffic sensors associated with the roads. Further, the current traffic conditions may be obtained by means of global positioning system (GPS) based devices associated with the vehicles that are traversing along the roads. Although such current traffic conditions provide some sort of convenience to the individuals in some situations, a number of problems exist with such current traffic conditions. For example, the current traffic conditions are predicted based on a consistent traffic signal time of traffic signals along the roads. However, the traffic signals may not operate with consistent traffic signal time. Therefore, such current traffic conditions may not be reliable due to one or more limitations, such as different star-stop time at different traffic signals, different traffic signal timings in different hours of a day, different time interval for different possible transitions at the traffic signals (such as a right turn signal is open for a longer period of time than a straight transition), manual control of the traffic signals, free left or right transition scenarios which are different from other turn transitions at the same traffic signal, and the like. Hence, such current traffic conditions are typically inaccurate, and are of little practical use for travel planning by the individuals.

In light of the foregoing, there exists a need for a technical and more reliable solution that solves the above-mentioned problems and predicts the current traffic conditions of the roads in the geographical area that improves routing of various types of vehicles along the roads, thereby, improving travel experience of the individuals during their rides.

SUMMARY

Various embodiments of the present invention provide a method and a system for predicting traffic conditions of a geographical area are provided. The system includes circuitry that generates a directed graph of a road network of the geographical area based on static data associated with the road network. Position information is received from one or more devices of one or more first vehicles that are traversing between a plurality of road segments of the road network including at least first and second road segments. The position information is received after a regular interval of time. A traffic signal is associated with at least one of the first and second road segments. The received position information is located on the generated directed graph. Further, first and second times for each of the one or more first vehicles are determined based on the located position information on the generated directed graph. The first time of a first vehicle from the one or more first vehicles is a first entry time of the first vehicle into the first road segment. The second time of the first vehicle is a second entry time of the first vehicle into the second road segment. For each of the one or more first vehicles, a time difference between the first and second times is determined. Further, a time period associated with one or more vehicle-related services of each of the one or more first vehicles along the first road segment including the traffic signal is filtered out from the time difference to obtain a filtered time difference for each of the one or more first vehicles. A traffic time of the first road segment including the traffic signal is determined based on an average of filtered time differences associated with each of the one or more first vehicles. The traffic conditions of the road network of the geographical area are predicted based on the determined traffic time of each of the plurality of road segments.

In an embodiment, the static data includes at least one of latitude information, longitude information, elevation values for start, end, and middle points of the plurality of road segments, or turn and speed restrictions of the plurality of road segments. Further, the generated directed graph includes a plurality of nodes including at least first and second nodes that indicate at least the first and second road segments, respectively. The generated directed graph further includes one or more directed edges including at least one directed edge between the first and second nodes that indicates a transition between the first and second nodes. Further, in an embodiment, the generated directed graph is updated in a defined preferential order of availability of at least one of current traffic data, historical traffic data, cluster level traffic data, or default traffic data.

The current traffic data is generated based on the position information that is received after the regular interval of time from the one or more devices of the one or more first vehicles. The historical traffic data is generated based on day-wise, holiday, weekday, or weekend traffic data. The historical traffic data may further be generated based on at least one of the day-wise, holiday, weekday, or weekend data within the time bucket and one or more neighboring time buckets. The historical traffic data may be selected based on a second defined preferential order. The selection of the generated historical traffic data is further decayed to remove staleness from the generated historical traffic data. In an embodiment, the generated historical traffic data is decayed based on a decay factor and a ranged function. The ranged function is a combination of a volume of the generated historical traffic data and a volume of the current traffic data. Further, a range of the decay factor is between 0 and 1. The cluster level traffic data is generated by means of a clustering technique that establishes equivalence between similar road segments of the plurality of road segments based on one or more features associated with at least one of the geographical area, a road type, the elevation values for start, end, and middle points of the plurality of road segments, or historical traffic conditions. The default traffic data is generated based on default speeds associated with the plurality of road segments.

Further, in an embodiment, the circuitry determines a travel time for a second vehicle to travel along one or more routes of the road network including the plurality of road segments based on the predicted traffic conditions. The travel time is determined in response to a booking request received from a passenger device of a passenger to travel between source and destination locations. The one or more routes are associated with the source and destination locations of the booking request. Further, the second vehicle is routed along one of the one or more routes based on the determined travel time for the second vehicle and a travel preference of at least one of the passenger or a transport service provider providing the second vehicle for the travel. The travel preference is associated with at least one of cost or time constraints of the travel. The travel preference of the passenger is determined based on at least one of historical travel data of the passenger or real-time travel data received from the passenger device before routing the second vehicle. The travel preference of the transport service provider is determined based on a defined setting associated with at least one of a route preference, a passenger value, or a gross merchandise value (GMV).

Thus, in accordance with various embodiments of the present invention, the method and the system are provided for predicting the traffic conditions along the road segments of the geographical area, and thus, the problems due to irregular start-stop patterns associated with one or more traffic signals in the road network are minimized. Further, based on the predicted traffic conditions, the travel time and fare corresponding to the booking request are determined that can meet the expected preferences of at least one of the passenger or the transport service provider, enabling optimal routing of the second vehicle. Further, the optimal routing of the second vehicle ensures safety of the passenger and a driver of the second vehicle allocated to the passenger.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

FIG. 4 is a flow chart that illustrates a method for generating a directed graph of a road network of a geographical area, in accordance with an embodiment of the present invention;

Figure 1:
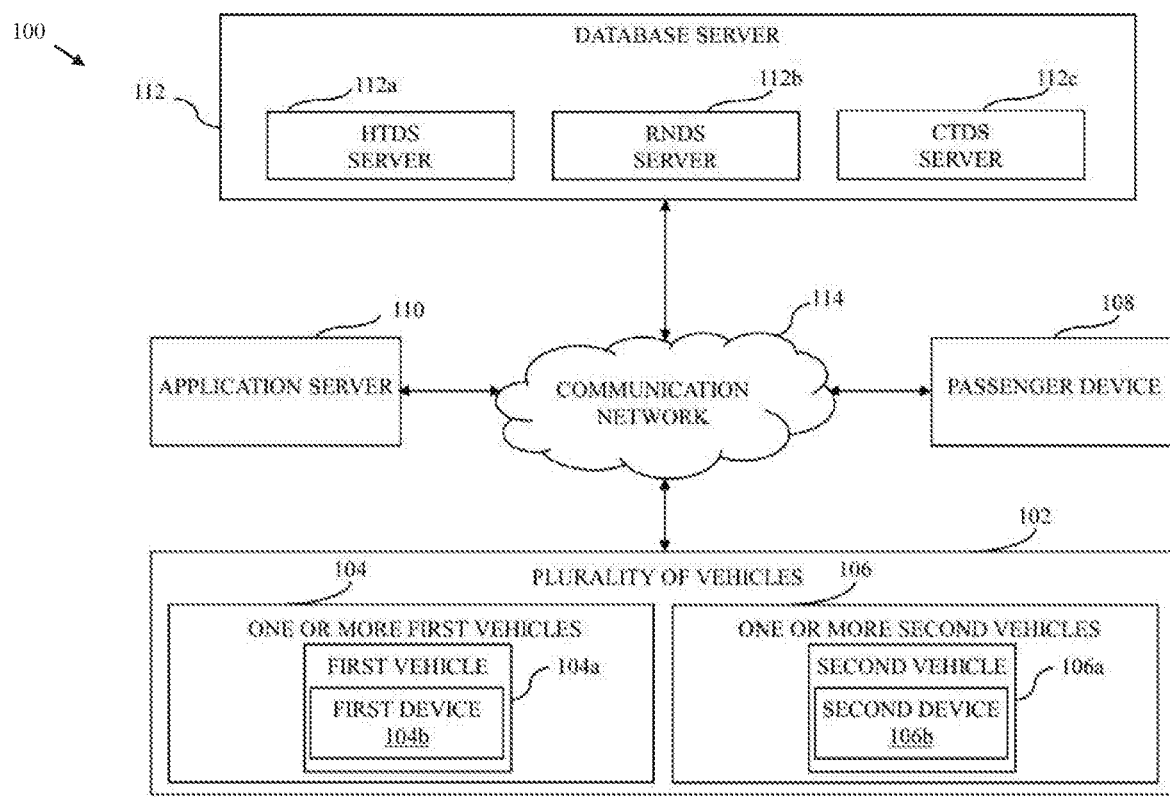
FIG. 1 is a block diagram that illustrates an environment in which one or more embodiments of the present invention are practiced.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes systems and methods for predicting traffic conditions of a geographical area, and optimizing routing of vehicles in accordance with the predicted traffic conditions and preferences of at least one of passengers or a transport service provider. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Traffic on a road is typically a combination of one or more groups of road users, such as pedestrians, vehicles, and other conveyances, that are moving (or halted), either individually or together, while using the road for traveling. Generally, the road includes road segments that are separated by traffic signals to control the movement of road users along the road. Hereinafter, various methods of predicting traffic conditions, and routing the vehicles to transport passengers by a vehicle transit system have been described that will become apparent to a person having ordinary skill in the relevant art.

Referring now to FIG. 1, a block diagram that illustrates an environment 100 in which various embodiments of the present invention are practiced. The environment 100 includes a plurality of vehicles 102 including one or more first vehicles 104 and one or more second vehicles 106, a passenger device 108, an application server 110, and a database server 112 that communicate with each other by way of a communication network 114. Examples of the communication network 114 include, but are not limited to, wireless fidelity (Wi-Fi) network, a light fidelity (Li-Fi) network, a satellite network, the internet, a mobile network such as a cellular data network, a high-speed packet access (HSPA) network, or any combinations thereof. In an exemplary embodiment, the database server 112 may include one or more separate data storage servers, such as a historical traffic data storage (HTDS) server 112a, a road network data storage (RNDS) server 112b, and a current traffic data storage (CTDS) server 112c.

The plurality of vehicles 102 (hereinafter "vehicles 102") are means of transport that are deployed by a vehicle transit system, such as a transport service provider, to provide vehicle services to passengers. For example, a vehicle of the vehicles 102 is an automobile, a bus, a car, a motor bike, a truck, or the like. In an embodiment, the vehicles 102 may be traversing along road segments of a road network associated with a geographical area. For example, the vehicles 102 may be traversing along the road segments to transport the passengers to their destination locations. In another example, the vehicles 102 may be traversing along the road segments to pick the passengers from their pick-up locations. In another example, the vehicles 102 may be traversing along the road segments to obtain new allocations. The vehicles 102 include the one or more first vehicles 104 (hereinafter "vehicles 104") and the one or more second vehicles 106 (hereinafter "vehicles 106"). Vehicles 104a and 106a of the vehicles 104 and 106, respectively, may include devices 104b and 106b, respectively. The devices 104b and 106b are computing devices that are utilized by drivers of the vehicles 104a and 106a, respectively, to perform one or more activities. The drivers may utilize their respective devices 104b and 106b to view a new booking request by means of an application installed on their respective devices 104b and 106b, respectively. The drivers may further utilize their respective devices 104b and 106b to accept or reject the new booking request. The drivers may further utilize the devices 104b and 106b to view one or more routes between source and destination locations that are associated with the accepted booking request. Further, in an embodiment, the devices 104b and 106b may include one or more position tracking devices (e.g., GPS sensors) for detecting position information of the devices 104b and 106b, respectively, and transmit the detected position information to the application server 110 over the communication network 114.

In an exemplary embodiment, each of the devices 104b and 106b may be a vehicle head unit. In another exemplary embodiment, the devices 104b and 106b may be communication devices, such as smartphones, personal digital assistants (PDAs), tablets, or any other portable communication devices, that are placed inside the vehicles 104a and 106a, respectively. In an event when the devices 104b and 106b are placed inside the vehicles 104a and 106a, respectively, the detected position information of the devices 104b and 106b may be utilized to determine position information of the vehicles 104a and 106a, respectively. However, a person having ordinary skill in the art will understand that the scope of the present invention is not limited to the determination of the position information of the vehicles 104a and 106a based on the detected position information of the devices 104b and 106b. The one or more position tracking devices may be embedded inside the vehicle 104a or 106a for detecting and transmitting the position information of the vehicle 104a or 106a to the application server 110 over the communication network 114.

The passenger device 108 is a computing device that is utilized by a passenger to perform one or more activities, including transmitting a booking request by means of a service application installed on the passenger device 108 to the application server 110. The booking request may be a ride request to travel between various locations including source and destination locations. To schedule the ride, the passenger provides details of the booking request, such as the source location, the destination location, a vehicle type, a pick-up time, a travel time constraint, a travel cost constraint, or the like, by means of the installed service application. In response to the transmitted booking request, the passenger device 108 receives the allocation of a vehicle from the vehicles 102, for example, the vehicle 106a that is available for the ride, from the application server 110. The passenger views the allocation details on the passenger device 108 by means of the installed service application, and provides an input, either to confirm or reject the allocation by the application server 110. Examples of the passenger device 108 include, but are not limited to, a personal computer, a laptop, a smartphone, a tablet computer, and the like.

The application server 110 is a computing device, a software framework, or a combination thereof, that may provide a generalized approach to create the application server implementation. In an embodiment, various operations of the application server 110 may be dedicated to execution of procedures, such as, but are not limited to, programs, routines, or scripts stored in one or more memories for supporting its applied applications. In an embodiment, the application server 110 generates a directed graph of the road network of the geographical area based on static data associated with the road network. Further, the application server 110 locates the position information received from devices (such as the device 104b) of the vehicles 104 (e.g., the vehicle 104a) on the generated directed graph. The vehicles 104 are one or more vehicles of the vehicles 102 that are traversing between the road segments including at least first and second road segments. Further, in an embodiment, for each of the vehicles 104, the application server 110 determines first and second times based on the located position information on the generated directed graph. The first time for the vehicle 104a is a time instance of an entry of the vehicle 104a into the first road segment. The second time of the vehicle 104a is a time instance of an entry of the vehicle 104a into the second road segment.

Further, in an embodiment, the application server 110 determines a traffic time of the first road segment including at least a traffic signal. The traffic time is determined based on an average of filtered time differences associated with each of the vehicles 104. A time difference for the vehicle 104a is determined based on a difference between the first and second times of the vehicle 104a. Further, a time period associated with one or more vehicle-related services (such as a service related to refueling, repairs, mechanical adjustments, penalty due to traffic breakdown, or the like) of the vehicle 104a along the first road segment including the traffic signal is filtered out from the time difference to obtain a filtered time difference for the vehicle 104a. Similarly, the filtered time difference for each of remaining vehicles from the vehicles 104 may be determined. Similarly, the application server 110 may determine the traffic time for each of remaining road segments from the road segments. Based on the determined traffic time for each of the road segments, the application server 110 predicts the traffic conditions of the road network of the geographical area.

Further, in an embodiment, the application server 110, in response to the booking request received from the passenger device 108, selects one of the vehicles 102, for example, the vehicle 106a that is available for the allocation. The application server 110 determines a travel time for the vehicle 106a to travel along each of the one or more routes of the road network including the road segments. The travel time is determined based on the predicted traffic conditions in response to the booking request by the passenger. Based on the determined travel time and a travel preference of at least one of the passenger or the transport service provider, the application server 110 routes the vehicle 106a along one of the one or more routes. The travel preference of the passenger is associated with at least one of the time or cost constraints of the travel. The travel preference of the transport service provider is associated with at least one of a route constraint, a passenger value constraint, or a gross merchandise value (GMV) constraint. Examples of the application server 110 include, but are not limited to, a personal computer, a laptop, or a network of computer systems. The application server 110 may be realized through various web-based technologies such as, but not limited to, a Java web-framework, a .NET framework, a PHP framework, or any other web-application framework. The various operations of the application server 110 have been described in detail in conjunction with FIGS. 2, 3A-3C, and 4-6.

The database server 112 is a data management and storage server that manages and stores passenger information of the passengers (such as the passenger who has requested for the ride) and driver information of the drivers associated with the vehicles 102. The database server 112 includes a processor (not shown) and a memory (not shown) for managing and storing the passenger and driver information (e.g., an identity, a contact number, a travel preference, or the like). The processor further manages and stores historical travel data of the passenger and the drivers in the memory. The historical travel data of the passenger includes historical travel requests and cancellations by the passenger, historical feedback of the passenger, or the like. The historical travel data of the drivers includes historical travel supplies and cancellations by the drivers, historical feedback of the drivers, or the like. In an embodiment, the processor further manages and stores historical traffic data, road network data, and current traffic data in the memory.

In another embodiment, the processor stores the historical traffic data, the road network data, and the current traffic data in a separate memory, such as the HTDS server 112a, RNDS server 112b, and CTDS server 112c, respectively. The historical traffic data includes day-wise, holiday, weekday, or weekend traffic data of the road network that had been obtained from traffic patterns captured by the devices of the vehicles 102 in the past. The road network data includes the static data associated with the road network, including latitude information, longitude information, elevation values for start, end, and middle points of the road segments, or a combination thereof. The static data further includes traffic-related information, such as one-way, two-ways, turn and speed restrictions associated with each of the road segments. The current traffic data includes real-time traffic data generated by the application server 110 based on the traffic patterns captured in a real-time. The processor further manages and stores cluster level traffic data or default traffic data generated by the application server 110 in the memory. Further, in an embodiment, the database server 112 may receive a query from the application server 110 over the communication network 114, to retrieve at least one of the passenger or driver information, historical travel data of the passenger or the driver, the historical traffic data, the road network data, the current traffic data, the cluster level traffic data, the default traffic data or the like. The database server 112, in response to the received query from the application server 110, retrieves and transmits the requested data to the application server 110 over the communication network 114. Examples of the database server 112 include, but are not limited to, a personal computer, a laptop, or a network of computer systems.

Figure 2:
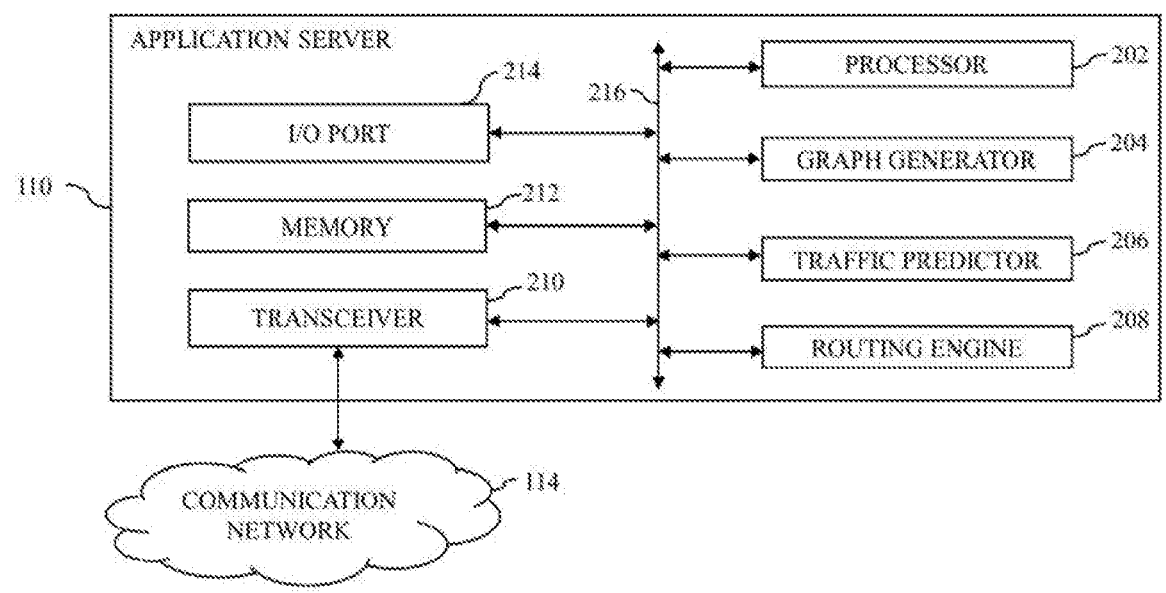
FIG. 2 is a block diagram that illustrates an application server of the environment of FIG. 1, in accordance with an embodiment of the present invention.

Referring now to FIG. 2, a block diagram that illustrates the application server 110 of the environment 100 of FIG. 1 is shown, in accordance with an embodiment of the present invention. The application server 110 includes circuitry such as a processor 202, a graph generator 204, a traffic predictor 206, a routing engine 208, a transceiver 210, a memory 212, and an input/output (I/O) port 214 that communicate with each other by way of a communication bus 216.

The processor 202 includes suitable logic, circuitry, and/or interfaces that are operable to execute one or more instructions stored in the memory 212 to perform one or more operations. For example, the processor 202 determines an availability status of each of the vehicles 102, and stores in the memory 212. The availability status indicates whether one or more of the vehicles 102 are occupied with current trips or are available for new trip requests. The processor 202 further receives the position information from the devices (e.g., the devices 104b and 106b) of the vehicles 102 (e.g., the vehicles 104a and 106a, respectively) by way of the transceiver 210 over the communication network 114, and determines the position information of the vehicles 102 and stores in the memory 212. The processor 202 receives the booking request from the passenger device 108 by way of the transceiver 210 over the communication network 114. The processor 202 processes the received booking request to determine the booking details provided by the passenger. Based on the processed booking request and the current vehicle status of the vehicles 102, the processor 202 selects one vehicle (e.g., the vehicle 106a) from the vehicles 102, and allocates the vehicle 106a to the passenger. The vehicle 106a is allocated to the passenger in response to an acceptance message received from the device 106b that has been provided by the driver of the vehicle 106a.

Further, the processor 202 determines the travel time for the vehicle 106a to travel along each of the one or more routes of the road network based on the traffic conditions predicted by the traffic predictor 206. Each of the one or more routes are associated with the source and destination locations of the booking request provided by the passenger. Further, for each of the one or more routes, the processor 202 determines a travel cost based on at least one of the determined travel time, the predicted traffic conditions, or a travel distance associated with each of the one or more routes. Further, the processor 202 may render a user interface on a display of the passenger device 108. The user interface presents at least one of the determined travel time or travel cost of the one or more routes corresponding to the booking request. The user interface may further present vehicle and driver information of the vehicle 106a. In response to the rendered user interface, the processor 202 may receive a confirmation message or a rejection message for the allocated vehicle 106a from the passenger device 108 by way of the transceiver 210 over the communication network 114. In an event of the confirmation message provided by the passenger, the processor 202 allocates the vehicle 106a to the passenger. Examples of the processor 202 include an application-specific integrated circuit (ASIC) processor, a reduced instruction set computing (RISC) processor, a complex instruction set computing (CISC) processor, a field-programmable gate array (FPGA), or the like.

The graph generator 204 includes suitable logic, circuitry, and/or interfaces that are operable to execute one or more instructions stored in the memory 212 to perform one or more operations. For example, the graph generator 204 generates the directed graph of the road network of the geographical area based on the static data of the road segments of the road network. The generated directed graph includes nodes including at least first and second nodes that indicate at least the first and second road segments, respectively. The generated directed graph further includes directed edges including at least one directed edge between the first and second nodes that indicates a transition between the first and second road segments. The graph generator 204 further locates the position information received from the devices (e.g., the device 104b) of the vehicles 104 (e.g., the vehicle 104a) on the generated directed graph. The graph generator 204 further updates the generated directed graph based on at least one of the current traffic data, the historical traffic data, the cluster level traffic data, or the default traffic data. The generated directed graph is updated in a first defined preferential order of the availability of the current traffic data, the historical traffic data, the cluster level traffic data, or the default traffic data. The graph generator 204 may be implemented by means of one or more processors, such as, but are not limited to, an ASIC processor, a RISC processor, a CISC processor, a FPGA, or a combination thereof.

The traffic predictor 206 includes suitable logic, circuitry, and/or interfaces that are operable to execute one or more instructions stored in the memory 212 to perform one or more operations. For example, the traffic predictor 206 determines the first and second times for each of the vehicles 104 based on the located position information of the vehicles 104 on the generated directed graph. In an exemplary embodiment, the first and second times for the vehicle 104a is determined based on the first and second entry time of the vehicle 104a into the first and second road segments, respectively. The first and second entry time are obtained from the generated directed graph on which the position information of the vehicle 104a has been located by the graph generator 204. The traffic predictor 206 further determines the time difference for each of the vehicles 104 based on the corresponding first and second times. Thereafter, for each of the vehicles 104, the time period associated with the one or more vehicle-related services of each of the vehicles 104 is determined. In an exemplary embodiment, for the vehicle 104a, the time period associated with a vehicle-related service (e.g., refueling at a petrol station along the first road segment) may be determined based on start and stop time associated with the vehicle-related service that is provided by the device 104b of the vehicle 104a. Further, for each of the vehicles 104, the time period is filtered out from the corresponding time difference to obtain the filtered time difference. The traffic predictor 206 determines the traffic time of the first road segment including the traffic signal based on the average of the filtered time differences associated with each of the vehicles 104. Similarly, the traffic predictor 206 determines the traffic time of each of the remaining road segments. Further, the traffic predictor 206 predicts the traffic conditions of the road network based on the determined traffic time of each of the road segments. The traffic predictor 206 may be implemented by means of one or more processors, such as, but are not limited to, an ASIC processor, a RISC processor, a CISC processor, a FPGA, or a combination thereof.

The routing engine 208 includes suitable logic, circuitry, and/or interfaces that are operable to execute one or more instructions stored in the memory 212 to perform one or more operations. For example, the routing engine 208 selects a route from the one or more routes based on the determined travel time, the determined travel cost, or the travel preferences of the passenger or the transport service provider. Further, the routing engine 208 routes the vehicle 106a along the selected route to transport the passenger from the source location to the destination location of the booking request. The routing engine 208 may be implemented by means of one or more processors, such as, but are not limited to, an ASIC processor, a RISC processor, a CISC processor, a FPGA, or a combination thereof.

The transceiver 210 includes suitable logic, circuitry, and/or interfaces that are operable to transmit (or receive) information to (or from) various devices, such as the devices of vehicles 102, the passenger device 108, or the database server 112 over the communication network 114. For example, the transceiver 210 receives the position information from the devices of the vehicles 102, and stores in the memory 212. The transceiver 210 further receives the booking request from the passenger device 108, and stores in the memory 212. The transceiver 210 transmits allocation information of the vehicle 106a to at least one of the device 106b or the passenger device 108. The transceiver 210 further transmits routing information of the vehicle 106a to at least one of the device 106b or the passenger device 108. Examples of the transceiver 210 include, but are not limited to, an antenna, a radio frequency transceiver, a wireless transceiver, a Bluetooth transceiver, and the like. The transceiver 210 communicates with the devices of the vehicles 102, the passenger device 108, the database server 112, or the communication network 114 using various wired and wireless communication protocols, such as TCP/IP (Transmission Control Protocol/Internet Protocol), UDP (User Datagram Protocol), 2nd Generation (2G), 3rd Generation (3G), 4th Generation (4G) communication protocols, or any combination thereof.

The memory 212 includes suitable logic, circuitry, and/or interfaces to store the one or more instruction that are executed by the processor 202, the graph generator 204, the traffic predictor 206, the routing engine 208, the transceiver 210, or the I/O port 214 to perform the one or more operations. The memory 212 further stores the position information, the booking request, the allocation information, the routing information, or the predicted traffic conditions. Examples of the memory 212 include, but are not limited to, a random access memory (RAM), a read-only memory (ROM), a programmable ROM (PROM), and an erasable PROM (EPROM).

The I/O port 214 includes suitable logic, circuitry, and/or interfaces that are operable to execute one or more instructions stored in the memory 212 to perform one or more operations. The I/O port 214 may include various input and output devices that are configured to operate under the control of the processor 202 by way of the communication bus 216. For example, by means of the I/O port 214, an administrator provides one or more inputs to perform the one or more operations. For example, the administrator may define the one or more preferential orders by means of the I/O port 214. Examples of the input devices may include a universal serial bus (USB) port, an Ethernet port, a real or virtual keyboard, a mouse, a joystick, a touch screen, a stylus, a microphone, and the like. Examples of the output devices may include a display screen, a speaker, headphones, a universal serial bus (USB) port, an Ethernet port, and the like.

Figure 3A:
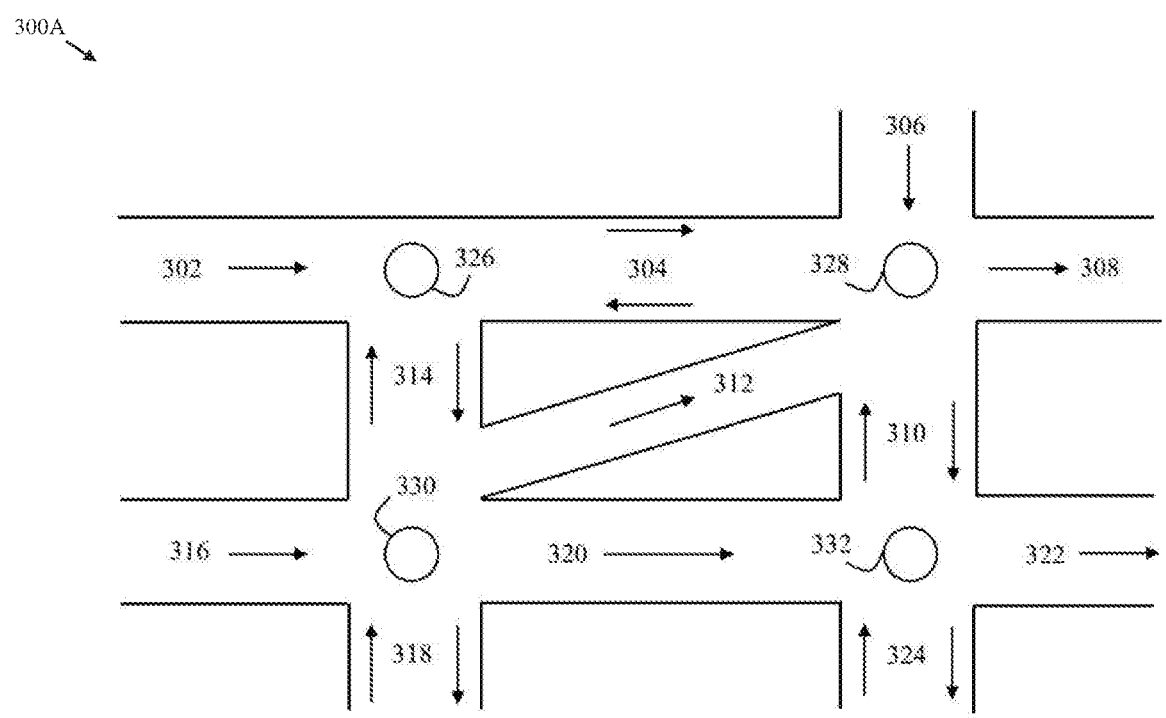
FIG. 3A illustrates a road network of a geographical area, in accordance with an embodiment of the present invention.

FIG. 3A illustrates the road network, such as an exemplary road network 300A, of the geographical area, in accordance with an embodiment of the present invention. The exemplary road network 300A includes road segments 302-324 and traffic signals 326-332. A unique identifier (ID) is associated with each of the road segments 302-324 and the traffic signals 326-332. Further, in an embodiment, for each of the road segments 302-324, the static data is obtained and stored in the database server 112 or in the memory 212. The static data includes at least one of the latitude information, the longitude information, and the elevation values for start, end, and middle points of each of the road segments 302-324. The static data further includes the traffic-related information, such as one-way, two-ways, turn and speed restrictions associated with each of the road segments 302-324. Further, in an embodiment, each of the traffic signals 326-332 may be associated with operating information, for example, the traffic signal 326 may be associated with a start time at which the traffic signal 326 starts operating, a stop time at which the traffic signal 326 stops operating, or the like. The operating information of the traffic signals 326-332 may vary from one location to another location or from one time instance to another time instance. In an exemplary embodiment, as shown, the road segments 302, 306, 308, 312, 316, 320, and 322 are one-way road segments, and the road segments 304, 310, 314, 318, and 324 are two-ways road segments. The traffic signal 326 is located between the road segments 302, 304, and 314. The traffic signal 328 is located between the road segments 304-312. The traffic signal 330 is located between the road segments 314-320. The traffic signal 332 is located between the road segments 310 and 320-324.

Figure 3B:
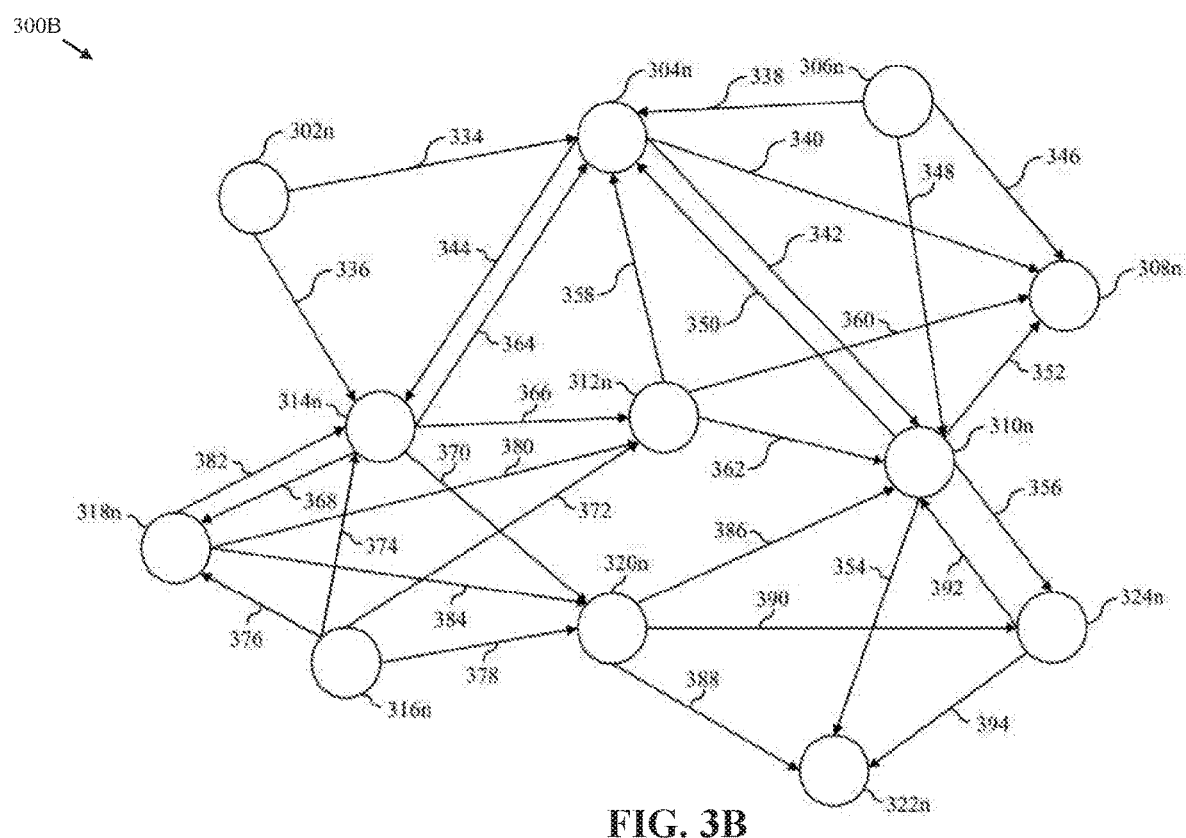
FIG. 3B illustrates a directed graph of the road network of FIG. 3A, in accordance with an embodiment of the present invention.

FIG. 3B illustrates the directed graph of the road network, such as an exemplary directed graph 300B of the exemplary road network 300A of FIG. 3A, in accordance with an embodiment of the present invention. The exemplary directed graph 300B is generated by the graph generator 204 based on the static data of the exemplary road network 300A. The exemplary directed graph 300B includes nodes 302n-324n that represent the road segments 302-324, respectively, and directed edges 334-394, each of which indicates the transition from one node to another node of the nodes 302n-324n. In an embodiment, the graph generator 204 determines the transition based on the static data of the exemplary road network 300A. For example, the directed edges 334 and 336 indicate transitions from the node 302n to the nodes 304n and 314n, respectively. The transition from the node 302n to the node 304n indicates that one or more of the vehicles 102 that are traversing along the road segment 302 can further traverse along the road segment 304. Similarly, the transition from the node 302n to the node 314n indicates that one or more of the vehicles 102 that are traversing along the road segment 302 can further traverse along the road segment 314. Similarly, other transitions associated with the nodes 304n-324n of the exemplary directed graph 300B may be identified, as shown.

Figure 3C:
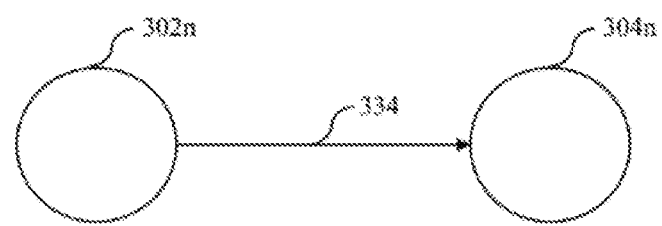
FIG. 3C illustrates transitions of vehicles from a first node to a second node of the directed graph of FIG. 3B for predicting traffic conditions, in accordance with an embodiment of the present invention.

FIG. 3C illustrates the transitions of the vehicles 104 from the node 302n to the node 304n of the exemplary directed graph 300B of FIG. 3B for predicting the traffic conditions of the road segment 302 associated with the node 302n, in accordance with an embodiment of the present invention. The transitions of the vehicles 104 from the node 302n to the node 304n have been indicated by the directed edge 334. The directed edge 334 may include the traffic signal (e.g., the traffic signal 326). Based on the position information of each of the vehicles 104 that are traversing from the node 302n to the node 304n, the traffic predictor 206 determines the first and second times (T1 and T2) for each of the vehicles 104. The traffic predictor 206 further determines the time differences between the first and second times for each of the vehicles 104. For example, a first time difference between the first and second times (T1 and T2) of the vehicle 104a that is traversing from the node 302n to the node 304n is given by equation (1):

$$\text{First time difference (TD1)} = T2 - T1 \qquad (1)$$

For example, if the vehicle 104a enters the node 302n at "10:00:00" AM and enters the node 304n at "10:20:00" AM, then the first time difference (TD1) is determined as "20" minutes (=10:20:00−10:00:00). Similarly, the traffic predictor 206 determines the time difference for each of remaining vehicles of the vehicles 104 that are traversing from the node 302n to the node 304n. Further, the traffic predictor 206 determines the time period associated with the one or more vehicle-related services for each of the vehicles 104. For example, the driver of the vehicle 104a stops the vehicle 104a at a petrol station along the node 302n for refueling the vehicle 104a. The start and stop time associated with the refueling transmitted by the device 104b of the vehicle 104a are "10:05:00" AM and "10:08:00" AM. In such a scenario, a first time period for the vehicle 104a is determined as "03" minutes (=10:08:00−10:05:00). Similarly, the traffic predictor 206 determines the time period for each of the remaining vehicles of the vehicles 104. Further, for each of the vehicles 104, the traffic predictor 206 determines the filtered time difference by filtering out the time periods from the corresponding time differences. For example, for the vehicle 104a, the filtered time difference is determined as "17" minutes (=20 minutes–03 minutes). Similarly, the traffic predictor 206 determines the filtered time difference of each of the remaining vehicles of the vehicles 104. Further, the traffic predictor 206 determines the traffic time of the node 302n including the directed edge 334 based on the average of the filtered time differences associated with each of the vehicles 104 that are traversing from the node 302n to the node 304n. Based on the determined traffic time of the node 302n including the directed edge 334, the traffic predictor 206 predicts the traffic conditions of the node 302n (i.e., the road segment 302).

Referring now to FIG. 4, a flow chart 400 that illustrates a method for generating the directed graph of the road network of the geographical area is shown, in accordance with an embodiment of the present invention.

At step 402, the static data of the road network of the geographical area is obtained. The graph generator 204 obtains the static data of the road network from the database server 112 (or from the memory 212) under the control of the processor 202 over the communication network 114. The static data includes the latitude information, the longitude information, and the elevation values for start, end, and middle points of each of the road segments associated with the road network. The static data further includes the traffic-related information, such as one-way, two-ways, turn and speed restriction information associated with each of the road segments.

At step 404, the directed graph of the road network is generated. The graph generator 204 generates the directed graph of the road network based on the static data of the road network. The generated directed graph includes the nodes (such as the nodes 302n-324n of FIG. 3B) that indicate the road segments of the road network. The generated directed graph further includes the directed edges (such as the directed edges 334-394 of FIG. 3B). Each of the directed edges may indicate the transition from one node to another node. For example, the directed edge 334 indicates the transition from the node 302n to the node 304n. Further, each of the directed edges may be associated with the traffic signals. For example, the directed edge 334 is associated with the traffic signal 326.

At step 406, the generated directed graph is updated. The graph generator 204 updates the generated directed graph based on the current traffic data, the historical traffic data, the cluster level traffic data, or the default traffic data. The generated directed graph is updated based on the first defined preferential order of the availability of the current traffic data, the historical traffic data, the cluster level traffic data, and the default traffic data. For example, firstly, the graph generator 204 checks for the availability of the current traffic data in the database server 112 or in the memory 212 under the control of the processor 202. In an event when the current traffic data is available, at step 406a, the graph generator 204 updates the generated directed graph based on the current traffic data. The current traffic data may be generated based on the position information received from the devices of the vehicles 104, and is stored in the database server 112 or in the memory 212.

However, it may be possible that in certain time buckets (i.e., time durations), the current traffic data for the road segments is unavailable. For example, the current traffic data may be unavailable due to absence of vehicle transitions along the road segments, lost signals, zero traffic situations (e.g., night time), or the like. In another exemplary scenario, the current traffic data may be insufficient (i.e., less than a minimum threshold of the current traffic data) due to insufficient vehicle transitions (i.e., less than minimum vehicle transitions). In such scenarios, the graph generator 204 checks for the availability of the historical traffic data in the database server 112 or in the memory 212 under the control of the processor 202. In an event when the historical traffic data is available, at step 406b, the graph generator 204 updates the generated directed graph based on the historical traffic data. The historical traffic data may be generated based on at least one of the day-wise, holiday, weekday, or weekend traffic data within a time bucket or the day-wise, holiday, weekday, or weekend traffic data within the time bucket and one or more neighboring time buckets of the time bucket, and is stored in the database server 112 or in the memory 212. The time bucket, for example, an hour bucket may be divided into two or more buckets, for example, of "30" minutes each. In a scenario when the time bucket is from "10:00:00" AM to "11:00:00" AM, the one or more neighboring time buckets may be at least one of "09:30:00" AM to "10:00:00" AM or "11:00:00" AM to "11:30:00" AM.

Further, in an embodiment, the historical traffic data includes at least day-wise historical traffic data, holiday-wise historical traffic data, weekday-wise historical traffic data, or weekend-wise historical traffic data. In such scenario, the historical traffic data is selected based on a second defined preferential order, in which a first preference is given to the day-wise historical traffic data in the time bucket, followed by the day-wise historical traffic data in the time bucket and the one or more neighboring time buckets, followed by the weekday-wise or weekend-wise historical traffic data in the time bucket, followed by the weekday-wise or weekend-wise historical traffic data in the time bucket and the one or more neighboring time buckets, and followed by the holiday-wise historical traffic data in the time bucket that is followed by the holiday-wise historical traffic data in the time bucket and the one or more neighboring time buckets. For example, when the generated directed graph is being updated for "Monday" in the time bucket "13:00:00" PM to "14:00:00" PM based on the historical traffic data, then the historical traffic data of one or more previous "Mondays" in the time bucket "13:00:00" PM to "14:00:00" PM and/or the one or more neighboring time buckets of the time bucket "13:00:00" PM to "14:00:00" PM may be utilized to update the generated directed graph. Further, "Monday" being a weekday, the weekday-wise historical traffic data in the time bucket "13:00:00" PM to "14:00:00" PM and/or the one or more neighboring time buckets of the time bucket "13:00:00" PM to "14:00:00" PM may further be utilized to update the generated directed graph. A person having ordinary skill in the art will understand that the scope of the present invention is not limited to the second defined preferential order, as described above. The second defined preferential order may be modified and updated as per the requirement in various applications of the vehicle transit system that provides vehicle services to the passengers.

Further, in an embodiment, the selection of the historical traffic data is decayed to remove staleness from the historical traffic data and to adapt new traffic patterns. The historical traffic data is decayed based on a decay factor and a ranged function that is a combination of a volume of the historical traffic data and a volume of the current traffic data. For example, for the first road segment, a first sum of historical transition time ($\Sigma$Transition_Time_History) and a first sum of historical transition counts (ΣTransition_Count_History) are maintained based on a historical transition time (i.e., historical filtered time differences) and historical transition counts (i.e., a count of the historical transition time), respectively, associated with the first road segment. Further, a second sum of current transition time (ΣTransition_Time_Current) and a second sum of current transition counts (ΣTransition_Count_Current) are determined based on a current transition time (i.e., the filtered time differences) and current transition counts (i.e., a count of the current transition time), respectively, associated with the first road segment. For predicting the current traffic conditions of the first road segment, an updated first sum of historical transition time (ΣUpdated_Transition_Time_History) and an updated first sum of historical transition counts (ΣUpdated_Transition_Count_History) are determined by using equations (2) and (3):

$$\begin{aligned}\Sigma\text{Updated\_Transition\_Time\_History}=\\(\Sigma\text{Transition\_Time\_History}*\text{Decay\_Factor})+\\ \Sigma\text{Transition\_Time\_Current}\end{aligned} \quad (2)$$

$$\begin{aligned}\Sigma\text{Updated\_Transition\_Count\_History}=\\(\Sigma\text{Transition\_Count\_History}*\text{Decay\_Factor})+\\ \Sigma\text{Transition\_Count\_Current}\end{aligned} \quad (3)$$

Thus, for the first road segment, an updated average of the transition time (Updated_Transition_time_Average) is determined by using equation (4):

$$\begin{aligned}\text{Updated\_Transition\_time\_Average}=\\(\Sigma\text{Updated\_Transition\_Time\_History})/\\(\Sigma\text{Updated\_Transition\_Count\_History})\end{aligned} \quad (4)$$

wherein, the decay factor (Decay_Factor) is determined using equation (5):

$$\text{Decay\_Factor}=b0+f(\text{Volume\_History},\text{Volume\_Current}) \quad (5)$$

wherein,
b0 is a decay control factor in a range of (0, 1);
Volume_History is a volume of the historical traffic data;
Volume_Current is a volume of the current traffic data;
f(Volume_History, Volume_Current) is a ranged bound continuous function ranging from [0, 1−b0]; and
function f( ) controls the decay rate based on volumes in current and historical time windows.

In an exemplary embodiment, when the volume of the current traffic data is high (in comparison to the volume of the historical traffic data), then a value of the function f( ) may tend towards "0". In another exemplary embodiment, when the volume of the current traffic data is low (in comparison to the volume of the historical traffic data), then the value of the function f( ) may tend towards "1−b0". For example, the function f(Volume_History, Volume_Current) is given by equation (6):

$$f(\text{Volume\_History},\text{Volume\_Current})=0, \text{ if Volume\_Current}\geq\text{Volume\_History},$$

else, $$f(\text{Volume\_History},\text{Volume\_Current})=\text{Min}\{1-b0,|\log(\text{Volume\_Current}/\text{Volume\_History})|\} \quad (6)$$

Further, in an embodiment, at step 406c, the generated directed graph may be updated based on the cluster level traffic data. The cluster level traffic data is generated by means of a clustering technique that establishes equivalence between similar road segments of based on one or more features associated with at least one of the geographical area, the road type, the elevation values for start, end, and middle points of the road segments, or the historical traffic conditions. The cluster level traffic data is utilized to predict the current traffic data due to missing data in the current traffic data. The cluster level traffic data is further utilized to predict traffic trends for one or more upcoming time buckets by analyzing the traffic data of one or more previous time buckets. Time series forecasting techniques may be utilized for such predictions. Further, in an embodiment, at step 406d, the generated directed graph may be updated based on the default traffic data. The default traffic data is generated based on default speeds associated with the road segments.

Figure 5:
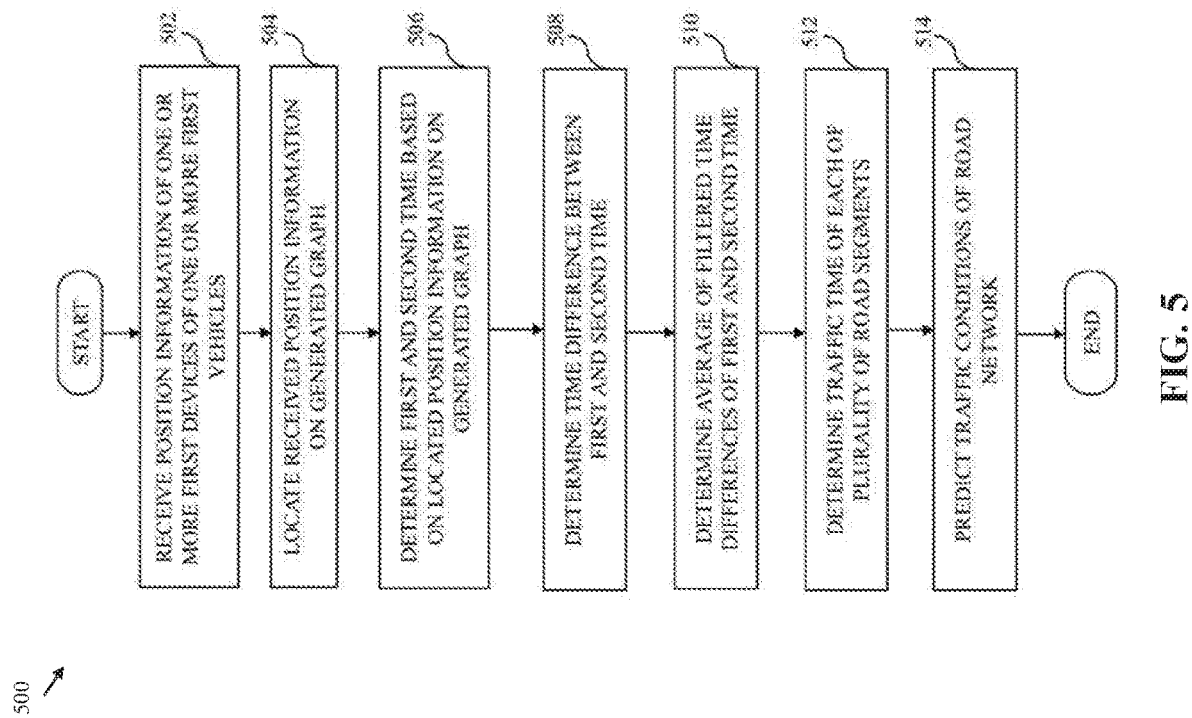
FIG. 5 is a flow chart that illustrates a method for predicting traffic conditions of a geographical area, in accordance with an embodiment of the present invention.

Referring now to FIG. 5, a flow chart 500 that illustrates a method for predicting the traffic conditions of the geographical area is shown, in accordance with an embodiment of the present invention.

At step 502, the position information from the devices of the vehicles 104 is received. The processor 202 receives the position information from the devices of the vehicles 104 that are traversing between the road segments including at least the first and second road segments, and stores in the memory 212. The received position information may indicate the position of the vehicles 104 along the road segments at one or more time instances. In an embodiment, at least one of the first and second road segments (e.g., the road segments 302 and 304 of FIG. 3A) may be associated with the traffic signal, such as the traffic signal 326. In another embodiment, the first and second road segments may be connected with each other by means of a free left, right, forward, or backward turn, and may not be associated with the traffic signal.

At step 504, the received position information is located on the generated directed graph. The graph generator 204 locates the received position information on the generated directed graph for each of the vehicles 104.

At step 506, the first and second times are determined based on the located position information on the generated directed graph. The traffic predictor 206 determines the first and second times corresponding to each of the vehicles 104 based on the located position information of the vehicles 104 on the generated directed graph.

At step 508, the time difference between the first and second times is determined. The traffic predictor 206 determines the time difference for each of the vehicles 104 based on the first and second times associated with each of the corresponding vehicles 104. The time difference for each of the vehicles 104 may be determined by means of the equation (1), as described above in conjunction with FIG. 3C. Further, for each of the vehicles 104a, the traffic predictor 206 determines the time period associated with the one or more vehicle-related services of each of the vehicles 104 along the first road segment. Thereafter, for each of the vehicles 104, the traffic predictor 206 determines the filtered time difference by filtering out the time period from the corresponding time difference of each of the vehicles 104a.

At step 510, the average of the filtered time differences is determined. The traffic predictor 206 determines the average of the filtered time differences associated with each of the vehicles 104 along each of the road segments.

At step 512, the traffic time of each of the road segments is determined. The traffic predictor 206 determines the traffic time of each of the road segments based on the determined average of the filtered time differences associated with each of the road segments. For example, the traffic time of the first road segment (with or without the traffic signal) may be determined based on the average of the filtered time differences of the first and second times of each of the vehicles 104 that are traversing from the first road segment to remaining road segments of the road segments.

At step 514, the traffic conditions of the road network are predicted. The traffic predictor 206 predicts the traffic conditions of the road network including the road segments based on the determined traffic time of each of the road segments. Similarly, the traffic conditions of the road network may be predicted based on the position information received from devices (e.g., the device 106b) of the vehicles 106 (e.g., the vehicle 106a).

Figure 6:
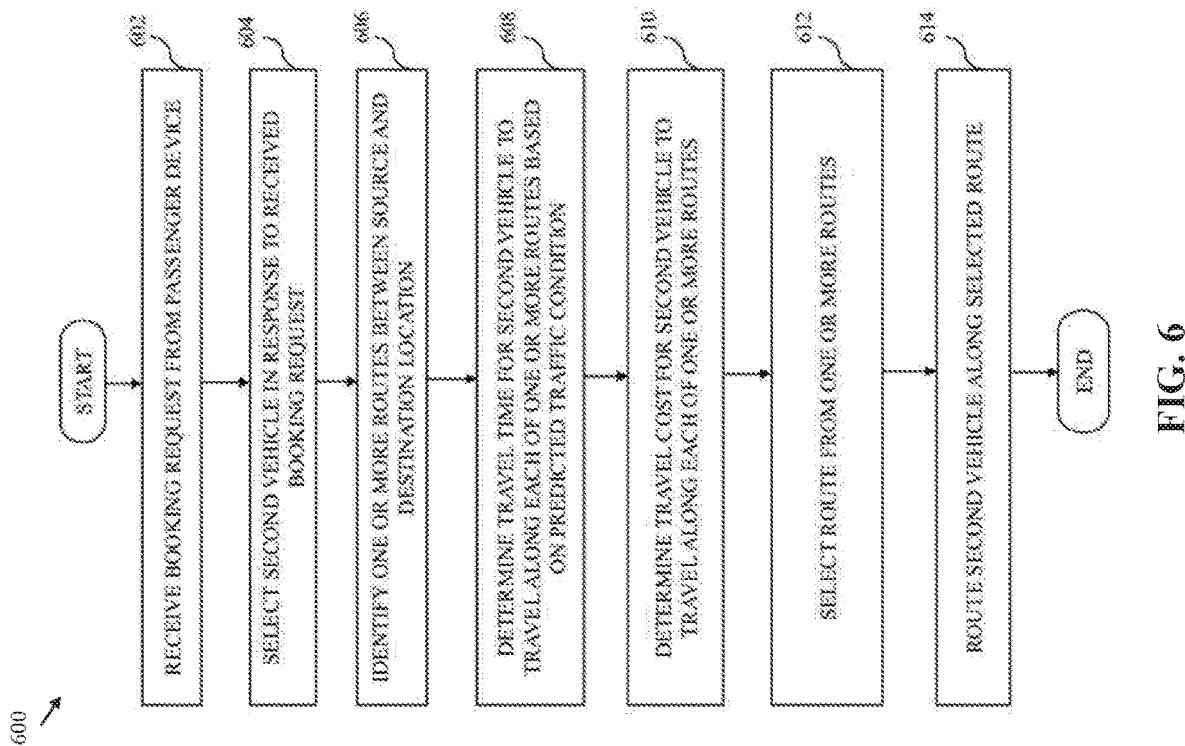
FIG. 6 is a flow chart that illustrates a method for routing a vehicle, in accordance with an embodiment of the present invention.

Referring now to FIG. 6, a flow chart 600 that illustrates a method for routing the vehicle 106a is shown, in accordance with an embodiment of the present invention.

At step 602, the booking request is received from the passenger device 108. The processor 202 receives the booking request from the passenger device 108 by way of the transceiver 210 over the communication network 114, and stores in the memory 212. The booking request of the passenger is the ride request to travel between the source and destination locations provided by the passenger. The booking request may further include one or more preferences of the passenger, for example, the vehicle type, the pick-up time, the travel time constraint, the travel cost constraint, or the like. In another embodiment, the one or more preferences of the passenger may be determined based on the historical travel data of the passenger.

At step 604, the vehicle 106a is selected from the vehicles 106. The processor 202 processes the received booking request and checks the vehicle status of the vehicles 106 to determine the availability of the vehicles 106. Based on the determined availability and the current position information of the vehicles 106, the processor 202 selects the vehicle 106a from the vehicles 106 for the allocation to the passenger. In another embodiment, the processor 202 may select one of the vehicles 104 (e.g., the vehicle 104a) that is available for the ride in response to the received booking request.

At step 606, the one or more routes are identified between the source and destination locations. The routing engine 208 identifies the one or more routes between the source and destination locations. At step 608, the travel time for the vehicle 106a to travel along each of the one or more routes is determined. The routing engine 208 determines the travel time for the vehicle 106a to travel along each of the one or more routes based on the predicted traffic conditions along each of the one or more routes.

At step 610, the travel cost for the vehicle 106a to travel along each of the one or more routes is determined. The routing engine 208 determines the travel cost for the vehicle 106a to travel along each of the one or more routes based on at least one of the travel time, the travel distance, or the predicted traffic conditions associated with each of the one or more routes.

At step 612, one route is selected from the one or more routes. The routing engine 208 selects the one route from the one or more routes based on at least one of security parameters of the passenger, the travel preferences of at least one of the passenger or the transport service provider, the travel time or cost of the one or more routes, an estimated time of arrival (ETA) at the source location for the pick-up, an ETA at the destination location for the drop-off, or a combination thereof. In an embodiment, security of the passenger is the most important responsibility of the transport service provider, and therefore, routing the vehicle 106a via a safer route optimizes the security of the passenger. Therefore, the one route may be selected from the one or more routes that optimizes the security of the passenger. For example, the one route may be selected from the one or more routes such that other vehicles (from the vehicles 104 and 106) are currently traversing along the selected route. The number of such other vehicles may be determined based on the real-time position information (or historical position information in the same time bucket) of the vehicles 104 and 106. In another embodiment, the one route may be selected from the one or more routes that has optimal network bandwidth such that the movement of the vehicles 104 and 106 can be effectively tracked. In another embodiment, the one route may be selected from the one or more routes that is in a vicinity of a police station or other professional security agencies.

Further, in an embodiment, the one route may be selected from the one or more routes that may have a higher number of shared-ride demands with respect to remaining routes of the one or more routes. The number of shared-ride demands for the road segments of the route may be determined based on the historical travel data of the passengers that are associated with the road segments. Further, the shared-ride demands may be associated with the same destination location as of the passenger or one or more other destination locations that are in the same direction of the destination location of the passenger. Further, each of the road segments of the route are provided with a preference. While providing the preference to each of the road segments, source-destination-time level demand metrics are analyzed, and thus, for a road segment from the road segments, a time of reaching the road segment from the source location of the passenger is adjusted by an expected time. Further, in an embodiment, the route with the higher number of the shared-ride demands may be constrained based on a permissible deviation in a drop-off time of the passenger to the destination location.

Further, in an embodiment, the one route may be selected from the one or more routes based on the travel preferences of at least one of the passenger or the transport service provider. The travel preferences of the passenger are associated with at least one of time or cost constraints of the travel. The travel preferences of the passenger may be determined based on the historical travel data of the passenger or real-time travel data (i.e., the booking request) received from the passenger device 108 before the routing of the vehicle 106a. The travel preference of the transport service provider may be determined based on defined settings associated with at least one of the route preference (as described above). The defined settings may further be associated with the passenger value of the passenger. For example, based on the historical travel data of the passenger, the passenger value of the passenger (in terms of gross revenue earned by the transport service provider) may be determined. Based on a deviation of the passenger value from a defined threshold, the one route may be selected from the one or more routes. The defined settings may further be associated with the GMV of the transport service provider. For example, if the GMV of the transport service provider has reached a target value set by the transport service provider, then the one route may be selected from the one or more routes such that the routing of the vehicle 106a along the selected route will have minimal impact on the GMV of the transport service provider.

In an embodiment, the routing engine 208 determines a cost sensitivity of the passenger based on the historical travel data. The routing engine 208 determines a probability of performing the vehicle booking for the ride for a cost range by the passenger, and is given by equation (7):

$$Pt(\text{booking}) = (\Sigma \text{Bookings}_{ratecard}) / (\Sigma \text{Intents}_{ratecard}) \quad (7)$$

wherein,

Pt(booking) is the probability of booking, and is a ratio of a total number of bookings given a rate card (e.g., price per kilometer) to a total number of intents at a time "t" and the given rate card.

Further, the routing engine 208 determines a time sensitivity of the passenger with respect to at least one of the pick-up time or the drop-off time. In one example, the time sensitivity towards ETA (i.e., the pick-up time or a vehicle arrival time to pick-up the passenger) is determined i.e., given the same rate card, the routing engine 208 determines a probability of conversion of the booking based on the ETA, and is given by equation (8):

$$Pt(\text{booking}) = (\Sigma \text{Bookings}_{ETA})/(\Sigma \text{Intents}_{ETA}) \qquad (8)$$

wherein,

Pt(booking) is the probability of booking, and is a ratio of a total number of bookings given the ETA to pick-up to a total number of intents at a time "t" and the given ETA.

In an embodiment, when a booking distribution is the same for all rate card values (i.e., a number of bookings by the passenger remains the same irrespective of variations in the rate card values over a period of time), then the routing engine 208 may determine that the passenger is not sensitive towards the travel cost. However, in an event of skewed booking distribution towards low rate card values, the routing engine 208 may determine that the passenger is sensitive towards the travel cost. Similarly, when the booking distribution is the same for all ETAs, then the routing engine 208 may determine that the passenger is not sensitive towards the travel time. However, in an event of skewed booking distribution towards small ETAs, the routing engine 208 may determine that the passenger is sensitive towards the travel time. Further, the routing engine 208 may select the one route from the one or more routes based on the travel time or cost of the one or more routes considering at least one of the time or cost sensitivity of the passenger. For example, when the passenger is time sensitive, then the routing engine 208 selects the route from the one or more routes that is fastest in the current predicted traffic conditions. Similarly, when the passenger is cost sensitive, then the routing engine 208 selects the route from the one or more routes that generates low travel cost for the passenger.

At step 614, the vehicle 106a is routed along the selected route. The routing engine 208 routes the vehicle 106a along the selected route such that the security parameters of the passenger, the travel preferences of at least one of the passenger or the transport service provider, the travel time or cost of the one or more routes, the ETA at the source location for the pick-up, the ETA at the destination location for the drop-off, or a combination thereof are optimized.

Figure 7:
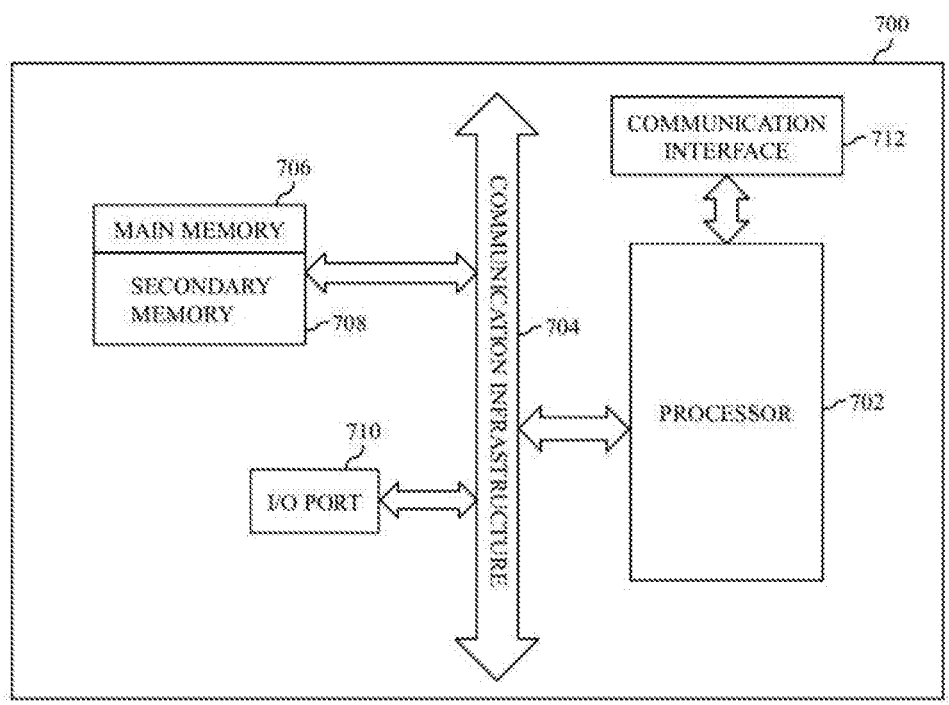
FIG. 7 is a block diagram that illustrates a computer system for routing a vehicle in a geographical area using predicted traffic conditions of the geographical area, in accordance with an embodiment of the present invention.

Referring now to FIG. 7, a block diagram that illustrates a computer system 700 for predicting the traffic conditions of the geographical area, and routing the vehicle 106a based on the predicted traffic conditions is shown, in accordance with an embodiment of the present invention. An embodiment of present invention, or portions thereof, may be implemented as computer readable code on the computer system 700. In one example, the application server 110 and the database server 112 of FIG. 1 may be implemented in the computer system 700 using hardware, software, firmware, non-transitory computer readable media having instructions stored thereon, or a combination thereof and may be implemented in one or more computer systems or other processing systems.

The computer system 700 includes a processor 702 that may be a special purpose or a general purpose processing device. The processor 702 may be a single processor, multiple processors, or combinations thereof. The processor 702 may have one or more processor "cores." Further, the processor 702 may be connected to a communication infrastructure 704, such as a bus, a bridge, a message queue, the communication network 114, multi-core message-passing scheme, and the like. In one example, the processor 202, the graph generator 204, the traffic predictor 206, and the routing engine 208 of FIG. 2 may be implemented by means of the processor 702, and performs the one or more operations of the processor 202, the graph generator 204, the traffic predictor 206, and the routing engine 208 for predicting the traffic conditions of the geographical area, and routing the vehicle 106a based on the predicted traffic conditions. The computer system 700 further includes a main memory 706 and a secondary memory 708. Examples of the main memory 706 may include random access memory (RAM), read-only memory (ROM), and the like. The secondary memory 708 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 700 further includes an input/output (I/O) port 710 and a communication interface 712. The I/O port 710 includes various input and output devices that are configured to communicate with the processor 702. Examples of the input devices may include a keyboard, a mouse, a joystick, a touchscreen, a microphone, and the like. Examples of the output devices may include a display screen, a speaker, headphones, and the like. The communication interface 712 may be configured to allow data to be transferred between the computer system 700 and various devices that are communicatively coupled to the computer system 700. Examples of the communication interface 712 may include a modem, a network interface, i.e., an Ethernet card, a communications port, and the like. Data transferred via the communication interface 712 may be signals, such as electronic, electromagnetic, optical, or other signals as will be apparent to a person skilled in the art. The signals may travel via a communications channel, such as the communication network 114 which may be configured to transmit the signals to the various devices that are communicatively coupled to the computer system 700. Examples of the communication channel may include, but are not limited to, cable, fiber optics, a phone line, a cellular phone link, a radio frequency link, a wireless link, and the like.

Computer program medium and computer usable medium may refer to memories, such as the main memory 706 and the secondary memory 708, which may be a semiconductor memory such as dynamic RAMs. These computer program mediums may provide data that enables the computer system 700 to implement the methods illustrated in FIGS. 4, 5, and 6. In an embodiment, the present invention is implemented using a computer implemented application. The computer implemented application may be stored in a computer program product and loaded into the computer system 700 using the removable storage drive or the hard disc drive in the secondary memory 708, the I/O port 710, or the communication interface 712.

A person having ordinary skills in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 702, and a memory, such as the main memory 706 and the secondary memory 708, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present invention provide, among other features, systems and methods for predicting the traffic conditions of the geographical area and routing the vehicles based on the predicted traffic conditions. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A method, comprising:
  receiving, by a server, position information from one or more devices of a plurality of first vehicles that are traversing between a plurality of road segments of a road network including at least first and second road segments, wherein the first and second road segments are separated by a traffic signal;
  for each of the plurality of first vehicles:
    locating, by the server, the received position information on a directed graph of the road network;
    determining, by the server, a first time instance and a second time instance based on the located position information on the directed graph, wherein the first time instance corresponds to a first entry time instance of each of the plurality of first vehicles for entering into the first road segment, and the second time instance corresponds to a second entry time instance of each of the plurality of first vehicles for entering into the second road segment from the first road segment; and
    determining, by the server, a time period associated with one or more vehicle related services along the first road segment;
  determining, by the server, a traffic time of the first road segment based on the determined time period for each of the plurality of first vehicles and an average of time differences of the first and second time instances of each of the plurality of first vehicles; and
  predicting, by the server, the traffic conditions of the road network based on the determined traffic time of each of the plurality of road segments.

2. The method of claim 1, wherein the directed graph includes a plurality of nodes including at least first and second nodes that indicate at least the first and second road segments, respectively, and one or more directed edges including at least one directed edge that indicates a transition between the first and second nodes.

3. The method of claim 1, further comprising:
  receiving, by the server, a booking request from a passenger device of a passenger to travel between a source location and a destination location; and
  determining, by the server, based on the booking request, a travel time for a second vehicle to travel along one or more routes of the road network including the plurality of road segments based on the predicted traffic conditions, wherein the one or more routes are associated with the source location and the destination location of the booking request.

4. The method of claim 3, further comprising routing, by the server, the second vehicle along one of the one or more routes based on the determined travel time and a travel preference of at least one of the passenger or a transport service provider providing the second vehicle for the travel to the passenger.

5. The method of claim 4, further comprising determining, by the server, a travel cost for the second vehicle to travel along the one or more routes of the road network based on at least one of the determined travel time or the predicted traffic conditions, wherein the second vehicle is routed along the one of the one or more routes further based on the determined travel cost.

6. The method of claim 4, wherein the travel preference is associated with at least one of time or cost constraints of the travel, wherein the travel preference of the passenger is determined based on at least one of historical travel data of the passenger or real-time travel data received from the passenger device before routing the second vehicle, and wherein the travel preference of the transport service provider is determined based on a setting associated with at least one of a route preference, a passenger value, or a gross merchandise value (GMV).

7. The method of claim 1, wherein the one or more vehicle related services include at least one of a refueling service, a repair service, and a mechanical adjustment service.

8. The method of claim 1, wherein the one or more vehicle related services include a penalty for traffic breakdown.

9. A method, comprising:
  receiving, by a server, position information from one or more devices of a plurality of first vehicles that are traversing between a plurality of road segments of a road network including at least first and second road segments, wherein the first and second road segments are separated by a traffic signal;
  for each of the plurality of first vehicles:
    locating, by the server, the received position information on a directed graph of the road network;
    determining, by the server, a first instance and a second time instance based on the located position information on the directed graph, wherein the first time instance corresponds to a first entry time instance of each of the plurality of first vehicles for entering into the first road segment, and the second time instance corresponds to a second entry time instance of each of the plurality of first vehicles for entering into the second road segment from the first road segment; and
    determining, by the server, a time period associated with the one or more vehicle related services along the first road segment; and
  predicting, by the server, the traffic conditions of the road network based on the first time instance, the second time instance, and the time period determined for each of the plurality of first vehicles.

10. The method of claim 9, wherein the directed graph includes a plurality of nodes including at least first and second nodes that indicate at least the first and second road segments, respectively, and one or more directed edges including at least one directed edge that indicates a transition between the first and second nodes.

11. The method of claim 9, further comprising:
receiving, by the server, a booking request from a passenger device of a passenger to travel between a source location and a destination location; and
determining, by the server based on the booking request, a travel time for a second vehicle to travel along one or more routes of the road network including the plurality of road segments based on the predicted traffic conditions, wherein the one or more routes are associated with the source location and the destination location of the booking request.

12. The method of claim 11, further comprising routing, by the server, the second vehicle along one of the one or more routes based on the determined travel time and a travel preference of at least one of the passenger or a transport service provider providing the second vehicle for the travel to the passenger.

13. The method of claim 12, further comprising determining, by the server, a travel cost for the second vehicle to travel along the one or more routes of the road network based on at least one of the determined travel time or the predicted traffic conditions, wherein the second vehicle is routed along the one of the one or more routes further based on the determined travel cost.

14. The method of claim 13, further comprising rendering, by the server, a user interface on the passenger device to present at least one of the determined travel time or the determined travel cost of the one or more routes to the passenger.

15. A system, comprising:
circuitry configured to:
receive position information from one or more devices of a plurality of first vehicles that traverses between a plurality of road segments of a road network that includes at least first and second road segments, wherein the first and second road segments are separated by a traffic signal;
for each of the plurality of first vehicles:
locate the received position information on a directed graph of the road network;
determine a first instance and a second time instance based on the located position information on the directed graph, wherein the first time instance corresponds to a first entry time instance of each of the plurality of first vehicles to enter into the first road segment, and the second time instance corresponds to a second entry time instance of each of the plurality of first vehicles to enter into the second road segment from the first road segment; and
determine a time period associated with one or more vehicle related services along the first road segment; and
generate the traffic conditions of the road network based on the first time instance, the second time instance, and the time period determined for each of the plurality of first vehicles.

16. The system of claim 15, wherein the directed graph includes a plurality of nodes that includes at least first and second nodes that indicate at least the first and second road segments, respectively, and one or more directed edges that include at least one directed edge that indicates a transition between the first and second nodes.

17. The system of claim 15, wherein the circuitry is further configured to:
receive a booking request from a passenger device of a passenger to travel between a source location and a destination location; and
determine, based on the booking request, a travel time for a second vehicle to travel along one or more routes of the road network that includes the plurality of road segments based on the generated traffic conditions, wherein the one or more routes are associated with the source location and the destination location of the booking request.

18. The system of claim 17, wherein the circuitry is further configured to route, the second vehicle along one of the one or more routes based on the determined travel time and a travel preference of at least one of the passenger or a transport service provider that provides the second vehicle for the travel to the passenger.

19. The system of claim 18, wherein the circuitry is further configured to determine a travel cost for the second vehicle to travel along the one or more routes of the road network based on at least one of the determined travel time or the generated traffic conditions, wherein the second vehicle is routed along the one of the one or more routes further based on the determined travel cost.

20. The system of claim 19, wherein the circuitry is further configured to render a user interface on the passenger device to present at least one of the determined travel time or the determined travel cost of the one or more routes to the passenger.

* * * * *